United States Patent
Ambach et al.

(10) Patent No.: US 9,456,026 B2
(45) Date of Patent: *Sep. 27, 2016

(54) FILE CHANGE NOTIFICATIONS IN A SCALE-OUT NAS SYSTEM

(71) Applicant: International Business Machines Corporation, Armonk, NY (US)

(72) Inventors: Christian Markus Michael Ambach, Beselich (DE); Ronnie Leif Sahlberg, Kariong (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 164 days.

This patent is subject to a terminal disclaimer.

(21) Appl. No.: 14/042,208

(22) Filed: Sep. 30, 2013

(65) Prior Publication Data

US 2014/0280500 A1    Sep. 18, 2014

Related U.S. Application Data

(63) Continuation of application No. 13/800,687, filed on Mar. 13, 2013.

(51) Int. Cl.
*H04L 29/08* (2006.01)
*G06F 17/30* (2006.01)

(52) U.S. Cl.
CPC ......... *H04L 67/10* (2013.01); *G06F 17/30067* (2013.01); *H04L 67/1097* (2013.01)

(58) Field of Classification Search
None
See application file for complete search history.

(56) References Cited

U.S. PATENT DOCUMENTS 5,721,825 A * 2/1998 Lawson et al. ............... 709/203
6,424,966 B1 * 7/2002 Meyerzon et al. ........... 707/610

(Continued)

OTHER PUBLICATIONS

Weil, Sage A., et al. "Rados: a scalable, reliable storage service for petabyte-scale storage clusters." Proceedings of the 2nd international workshop on Petascale data storage: held in conjunction with Supercomputing'07. ACM, 2007.*

Levy, Eliezer, and Abraham Silberschatz. "Distributed file systems: Concepts and examples." ACM Computing Surveys (CSUR) 22.4 (1990): 321-374.*

(Continued)

*Primary Examiner* — Scott B Christensen
*Assistant Examiner* — Sean Concannon
(74) *Attorney, Agent, or Firm* — Kunzler Law Group; Steven L. Bennett

(57) ABSTRACT

A method for file change notifications includes creating, on a first local node, a file change notification message in response to a client creating, deleting, and/or modifying a file system item addressed through a file path. The first local node notifies associated local client processes representing clients connected to the first local node and flagged to receive file change information. The notification message includes information regarding a file change for the file path. The method includes checking a global node for second local nodes flagged to receive file change information for the file path and sending a file change notification message from the first local node to the second local nodes in response to receiving identification of the second local nodes. A second local node notifies associated local client processes representing clients connected to a second local node and flagged to receive file change information for the file path.

9 Claims, 5 Drawing Sheets

(56) References Cited

U.S. PATENT DOCUMENTS

| | | | |
|---|---|---|---|
| 6,442,565 B1* | 8/2002 | Tyra et al. | |
| 6,965,924 B1* | 11/2005 | Gerthe | 709/218 |
| 7,143,093 B1 | 11/2006 | Bracho | |
| 8,181,180 B1* | 5/2012 | Anderson et al. | 718/102 |
| 8,266,136 B1 | 9/2012 | Pogde | |
| 2002/0078174 A1* | 6/2002 | Sim et al. | 709/219 |
| 2003/0131143 A1* | 7/2003 | Myers | 709/318 |
| 2004/0261082 A1* | 12/2004 | Steere et al. | 719/318 |
| 2005/0038791 A1* | 2/2005 | Ven | 707/100 |
| 2005/0091287 A1* | 4/2005 | Sedlar | G06F 17/30233 |
| 2006/0150256 A1* | 7/2006 | Fanton | G06F 21/10 726/27 |
| 2007/0240169 A1* | 10/2007 | Surlaker et al. | 719/318 |
| 2008/0033845 A1 | 2/2008 | McBride | |
| 2008/0077635 A1* | 3/2008 | Sporny et al. | 707/204 |
| 2008/0134213 A1 | 6/2008 | Alverson | |
| 2008/0307045 A1* | 12/2008 | Terada | 709/203 |
| 2010/0082774 A1* | 4/2010 | Pitts | 709/219 |
| 2010/0150139 A1 | 6/2010 | Lawson | |
| 2011/0213753 A1* | 9/2011 | Manmohan | 707/640 |
| 2012/0023077 A1 | 1/2012 | Kann | |
| 2012/0066372 A1 | 3/2012 | Jennings et al. | |

OTHER PUBLICATIONS

Chang, Fay, et al. "Bigtable: A distributed storage system for structured data." ACM Transactions on Computer Systems (TOCS) 26.2 (2008): 4.*

Burrows, Mike. "The Chubby lock service for loosely-coupled distributed systems." Proceedings of the 7th symposium on Operating systems design and implementation. USENIX Association, 2006.*

Microsoft Corporation, Common Internet File System (CIFS) Protocol, Chapter 2.2.7.4 NT_TRANSACT_NOTIFY_CHANGE (0x0004), [MS-CIFS] http://msdn.microsoft.com/en-us/library/ee442092 (v=prot.13).aspx, p. 488-492, Released: Jan. 18, 2013.

Microsoft Corporation, Common Internet File System (CIFS) Protocol, [MS-FSA] Chapter 2.1.4.1—Algorithm for Reporting a Change Notification for a Directory, http://msdn.microsoft.com/en-us/library/ff469511.aspx, Released: Jan. 18, 2013.

Final Office Action from U.S. Appl. No. 13/800,687, filed Mar. 13, 2013, Mailed Sep. 24, 2015.

U.S. Appl. No. 13/800,687, filed Mar. 13, 2013, Office Action mailed Apr. 8, 2016.

* cited by examiner

FILE CHANGE NOTIFICATIONS IN A SCALE-OUT NAS SYSTEM

CROSS-REFERENCE TO RELATED APPLICATIONS

This application is a continuation of U.S. patent application Ser. No. 13/800,687 entitled "FILE CHANGE NOTIFICATIONS IN A SCALE-OUT NAS SYSTEM" filed on Mar. 13, 2013 for Christian Markus Michael Ambach, et al. the entire contents of the above mentioned application is incorporated herein by reference for all purposes.

BACKGROUND

1. Field

The subject matter disclosed herein relates to file change notifications and more particularly relates to receiving file change notification requests and sending file change notifications in a scale-out network attached storage system.

2. Description of the Related Art

The ability to efficiently manage and store large amounts of data is a constant challenge for organizations, especially with large amounts of data being pushed daily to the cloud. Organizations must be able to provide quick and reliable access to the stored data. A common solution is a network attached-storage ("NAS") system. A NAS system provides file-based data storage connected to a network providing data access to a group of client devices. NAS is a popular solution for data storage and access because NAS provides a convenient method to share files among multiple computers and devices. Traditional NAS systems, however, present problems when the amount of data being stored reaches a certain threshold.

A scale-out NAS ("SONAS") system, on the other hand, provides a scalable storage solution that also offers efficiency and management benefits. In order to achieve these benefits, the components of a SONAS system must effectively communicate with each other, which includes efficient handling of file change notifications. In order to send file change notifications, a SONAS system must determine which clients are interested in receiving file change notifications. It may become difficult, however, to quickly determine which clients to send a file change notification as the number of active clients and stored files increases.

BRIEF SUMMARY

A method for file change notifications is disclosed. An apparatus, system, and computer program product also perform the functions of the method. The method for file change notifications includes creating, on a first local node, a file change notification message in response to a client creating, deleting, and/or modifying a file system item addressed through a file path. The first local node sends the file change notification message to one or more local client processes flagged to receive file change information for the file path and the one or more local client processes are associated with the first local node. In one embodiment, a local client process represents a client connected to the first local node. The notification message, in another embodiment, includes information regarding a file change for the file path. The method further includes checking a global node for one or more second local nodes flagged to receive file change information for the file path. The one or more second local nodes are different than the first local node.

The method further includes sending a file change notification message from the first local node to the one or more second local nodes in response to receiving identification of the one or more second local nodes flagged to receive file change information for the file path. A second local node sends the file change notification message to one or more local client processes flagged to receive file change information for the file path. The one or more local client processes are associated with the second local node and are different than the one or more local client processes associated with the first local node. A local client process, in one embodiment, represents a client connected to a second local node.

The method, in one embodiment, includes one or more local nodes storing file change notification information and a global node storing identification of the one or more second nodes flagged to receive file change information. In one embodiment, the first local node sends the file change notification message to the one or more second local nodes without sending the file change notification message to the global node. In another embodiment, the method further includes a global node storing identification of the one or more second local nodes flagged to receive file change information without storing file change notification information and/or local client process information associated with the file change notification information.

In one embodiment, the method further includes flagging a local client process to receive file change information for a file path in response to the local client process sending a file change notification request to an associated local node without sending a file change notification request to the global node. In another embodiment, the method includes flagging a local client process to receive file change information by storing notification information associated with the local client process on a data store of the local node without storing the notification information on a data store of the global node. In one embodiment, the notification information includes a file path, a local client process identifier, and/or one or more local client process attributes.

In a further embodiment, the method includes flagging a local node to receive file change information for a file path in response to a local client process associated with the local node being flagged to receive file change information for the file path. The local client process, in one embodiment, is the first local client process flagged to receive file change information for the file path. In another embodiment, the method includes flagging a local node to receive file change information by storing identification information associated with the local node on a data store of the global node. The identification information, in one embodiment, includes a file path, a local node name, and/or a local node number.

The method, in one embodiment, includes unflagging a local client process from receiving file change information for the file path in response to the local client process sending an unflag request to an associated local node without sending an unflag request to the global node. In another embodiment, the method includes unflagging a local node from receiving file change information for a file path in response to a local client process associated with the local node unflagging from receiving file change information for the file path. In yet another embodiment, the local client process is the last local client process unflagged to receive file change information for the file path.

In one embodiment, the method includes unflagging a local client process by deleting notification information regarding the local client process from the local data store of the local node. In another embodiment, the method includes unflagging a local node by deleting identification information regarding the local node from the global data store of the global node. In a further embodiment, the method includes deleting notification information from the local data store and/or identification information from the global data store by marking the information as deleted such that deleting the information occurs after the expiration of a predetermined period of time.

The method, in one embodiment, includes a second local node with a local proxy process. The local proxy process, in certain embodiments, receives a file change notification message from a first local node and sends the file change notification message to one or more local client processes flagged to receive file change information in response to receiving identification of one or more local client processes flagged to receive file change information. The method, in another embodiment, further includes sending a file change notification message to one or more second local nodes having one or more local client processes flagged to receive file change information for every parent directory in the file path. In one embodiment, the method includes a network protocol that the first local node, the global node, and the one or more second local nodes use to communicate. The network protocol, in certain embodiments, includes a server message block protocol.

A computer program product is included for file notifications in a scale-out network-attached storage system. The computer program product includes a computer readable storage medium having program code embodied therein. The program code is readable and/or executable by a processor to execute the steps of the method.

An apparatus is included with a notification creation module, a node identification module, and a notification distribution module. The notification creation module creates, on a first local node, a file change notification message in response to a client creating, deleting, and/or modifying a file system item addressed through a file path. The first local node sends the file change notification message to one or more local client processes flagged to receive file change information for the file path and the one or more local client processes are associated with the first local node. In one embodiment, a local client process represents a client connected to the first local node. The notification message, in another embodiment, includes information regarding a file change for the file path. The node identification module checks a global node for one or more second local nodes that are flagged to receive file change information for the file path. The one or more second local nodes are different than the first local node.

The notification distribution module sends a file change notification message from the first local node to the one or more second local nodes in response to receiving identification of the one or more second local nodes flagged to receive file change information for the file path. A second local node sends the file change notification message to one or more local client processes flagged to receive file change information for the file path. The one or more local client processes are associated with the second local node and are different than the one or more local client processes associated with the first local node. A local client process, in one embodiment, represents a client connected to a second local node.

In one embodiment, one or more local nodes store file change notification information and the global node stores identification of the one or more second nodes flagged to receive file change information. The first local node sends the file change notification message to the one or more second local nodes without sending the file change notification message to the global node. In another embodiment, the global node stores identification of the one or more second local nodes flagged to receive file change information without storing one or more of file change notification information and local client process information associated with the file change notification information.

In one embodiment, the apparatus includes a client registration module that flags a local client process to receive file change information for a file path in response to the local client process sending a file change notification request to an associated local node without sending a file change notification request to the global node. Flagging a local client process to receive file change information includes storing notification information associated with the local client process on a data store of the local node without storing the notification information on a data store of the global node. The notification information includes a file path, a local client process identifier, and/or one or more local client process attributes.

In another embodiment, the apparatus includes a node registration module that flags a local node to receive file change information for a file path in response to a local client process associated with the local node being flagged to receive file change information for the file path. The local client process is the first local client process flagged to receive file change information for the file path and flagging a local node to receive notification information includes storing identification information associated with the local node on a data store of the global node. The identification information includes a file path, a local node name, and/or a local node number.

In another embodiment, the apparatus includes a client deregistration module that unflags a local client process from receiving file change information for the file path in response to the local client process sending an unflag request to an associated local node without sending an unflag request to the global node. In one embodiment, the apparatus includes a node deregistration module that unflags a local node from receiving file change information for a file path in response to a local client process associated with the local node unflagging from receiving file change information for the file path. The local client process is the last local client process unflagged to receive file change information for the file path. In a further embodiment, unflagging a local client process includes deleting notification information regarding the local client process from the local data store of the local node and where unflagging a local node includes deleting identification information regarding the local node from the global data store of the global node.

In another embodiment, the apparatus includes a proxy module that receives a file change notification message from a first local node and sends the file change notification message to one or more local client processes flagged to receive file change information in response to receiving identification of one or more local client processes flagged to receive file change information. In one embodiment, the apparatus includes a network protocol that the first local node, the global node, and the one or more second local nodes use to communicate. The network protocol, in certain embodiments, includes a server message block protocol.

A system for file notification includes a first local node, a global node, and one or more second local nodes. The first local node, the global node, and the one or more second local nodes communicate over a network and each include a processor and operating system executing on the processor. The system includes a notification creation module that creates, on the first local node, a file change notification message in response to a client creating, deleting, and/or modifying a file system item addressed through a file path. The first local node sends the file change notification message to one or more local client processes flagged to receive file change information for the file path and the one or more local client processes are associated with the first local node. In one embodiment, a local client process represents a client connected to the first local node. The notification message, in another embodiment, includes information regarding a file change for the file path. The system includes a node identification module that checks the global node for one or more of the second local nodes that are flagged to receive file change information for the file path. The one or more second local nodes are different than the first local node.

The system includes a notification distribution module that sends a file change notification message from the first local node to the one or more second local nodes in response to receiving identification of the one or more second local nodes flagged to receive file change information for the file path. A second local node sends the file change notification message to one or more local client processes flagged to receive file change information for the file path. The one or more local client processes associated with the second local node and are different than the one or more local client processes associated with the first local node. A local client process, in one embodiment, represents a client connected to a second local node. In one embodiment, the system includes a computer network that facilitates communication between the first node, the global node, and/or the one or more second nodes. In certain embodiments, the computer network comprises a server message block protocol.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Figure 1:
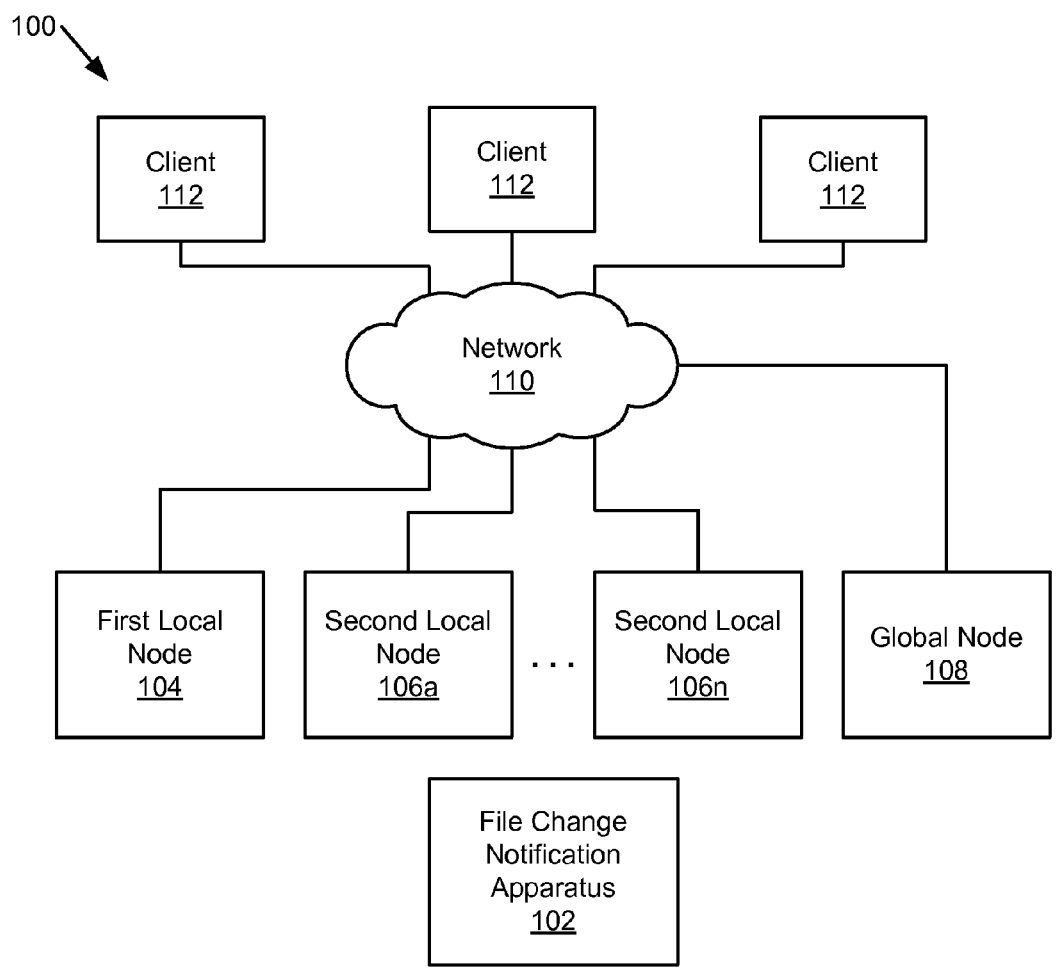
FIG. 1 is a schematic block diagram illustrating one embodiment of a system for file change notifications.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electromagnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

FIG. 1 is a schematic block diagram illustrating one embodiment of a system 100 for file change notifications. The system 100 includes a file change notification apparatus 102, a first local node 104, one or more second local nodes 106a-106n, a global node 108, a digital communication network 110, and a plurality of clients 112, which are described below.

In one embodiment, the system 100 includes a file change notification apparatus 102 that sends and/or receives file change notification messages triggered by a client 112. The file change notification apparatus 102, in one embodiment, may be located on a first local node 104, a second local node 106a-106n, and/or a global node 108. The file change notification apparatus 102, in another embodiment, includes elements in more than one node. For example, the file change notification apparatus 102 may be distributed between a first local node 104 and a global node 108, where some functions of the file change notification apparatus 102 reside in the global node 108. The file change notification apparatus 102 is discussed in more detail with regard to the apparatus 200 of FIG. 2 and the apparatus 300 of FIG. 3.

The system 100 includes a first local node 104, one or more second local nodes 106a-106n, and a global node 108. In one embodiment, the first local node 104, the one or more second local nodes 106a-106n, and/or the global node 108 may be a computer, a phone, a server, a laptop computer, a tablet computer, a mainframe computer, a blade center, or any other electronic device capable of sending and/or receiving file change notifications. In another embodiment, the first local node 104, the one or more second local nodes 106a-106n, and/or the global node 108, include a processor and an operating system.

The system 100 includes a digital communication network 110 that transmits file change notifications and other digital communications from a first local node 104 to a global node 108 and one or more second local nodes 106a-106n. The digital communication network 110 may include a wireless network, such as a wireless telephone network, a local wireless network, such as a Wi-Fi network, a Bluetooth® network, and the like. The digital communication network 110 may include a wide area network ("WAN"), a storage area network ("SAN"), a local area network ("LAN"), an optical fiber network, the internet, or other digital communication network known in the art. The digital communication network 110 may include two or more networks. The digital communication network 110 includes one or more servers, routers, switches, and other networking equipment. The digital communication network 110 may also include computer readable storage media, such as a hard disk drive, an optical drive, non-volatile memory, random access memory ("RAM"), or the like. In one embodiment, the digital communication network 110 includes a server message block ("SMB") protocol to facilitate communication between the local nodes 104, 106a-106n, the global node 108, and a plurality of clients 112.

In one embodiment, the system 100 includes a plurality of clients 112 connected to the first local node 104 and/or the one or more second local nodes 106a-106n through the network 110. A client 112 may be a computing device such as a mobile phone, a tablet computer, a notebook computer, a laptop computer, a desktop computer, a server, or other device capable of triggering file change notifications, such as creating, deleting, or modifying a file system item. Even though three clients 112 are depicted in FIG. 1, any number of clients 112 may be included in the system 100.

Figure 2:
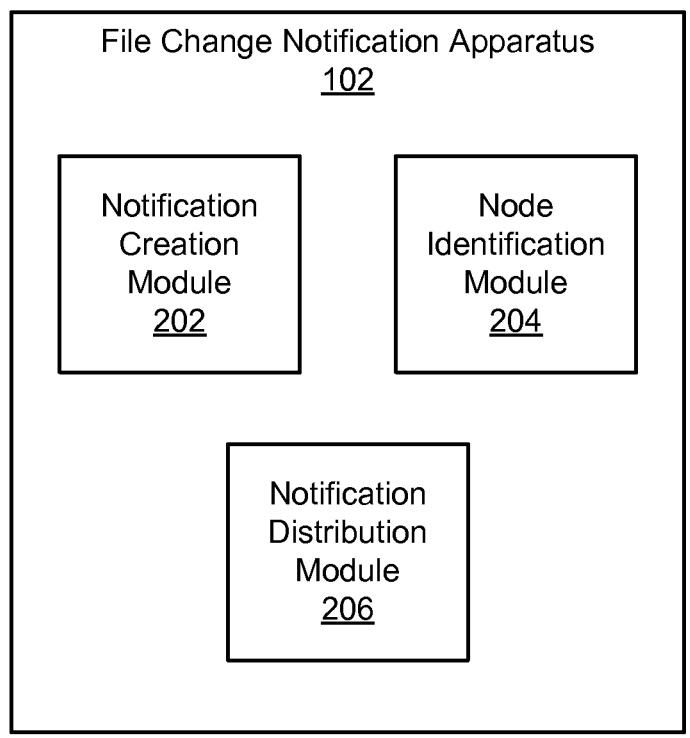
FIG. 2 is a schematic block diagram illustrating one embodiment of an apparatus for file change notifications.

FIG. 2 is a schematic block diagram illustrating one embodiment of an apparatus 200 that includes a file change notification apparatus 102. The file change notification apparatus 102 may include a notification creation module 202, a node identification module 204, and a notification distribution module 206, which are described below.

The apparatus 200, in one embodiment, includes a notification creation module 202 that creates, on a first local node 104, a file change notification message. In one embodiment, a client 112 triggers a file change notification by creating, deleting, or modifying a file system item addressed through a file path. For example, a file change notification may be triggered when a client 112 creates a new file, creates a copy of a file, deletes a file, and/or modifies a file located in a directory addressed by a file path such as "/usr/documents."

In one embodiment, the first local node 104 sends the file change notification message to one or more local client processes flagged to receive file change information for a file path in response to the notification creation module 202 creating a file change notification message. For example, a local client process may be flagged to receive file change notification messages for the file path "/usr/documents," such that if a file system item in "/usr/documents" is modified, the first local node 104 sends a file change notification message to the local client process.

In another embodiment, the one or more local client processes are associated with the first local node 104 such that a local client process receives file change notification messages from the first local node 104 and not from a second local node 106a-106n or a global node 108. In one embodiment, a local client process is located on the first local node 104. For example, the first local node 104 may be a server and the local client process may be an application running on the server. Alternatively, in another embodiment, a local client process may not be located on the first local node 104, but may be located on a device connected to the first local node 104 through the network 110. A local client process, in one embodiment, represents a client 112 connected to the first local node 104 and sends a client 112 a file change notification in response to the local client process receiving a file change notification message.

In one embodiment, the file change notification message created by the first local node 104 includes information regarding the file change for the file path. In certain embodiments, the information sent in the file change notification message may include the file path where the file change occurred, information regarding the local node 104, 106a-106n sending the message, information regarding the process and/or client that triggered the file change notification, a timestamp regarding when the notification was triggered, and/or the like.

In one embodiment, the apparatus 200 includes a node identification module 204 that checks a global node 108 for one or more second local nodes 106a-106n flagged to receive file change information for a file path. In one embodiment, the second local nodes 106a-106n are different than the first local node 104. The second local nodes 106a-106n, in another embodiment, include local client processes that are flagged to receive file change information for a file path. In one embodiment, a second local node 106a-106n may register with the global node 108 to receive file change information for a file path. For example, if a second local node 106a-106n has a local client process flagged to receive file change information for the "/usr/documents" directory, the second local node 106a-106n will register with the global node 108 to receive file change information for the "/usr/documents" directory.

The apparatus 200, in another embodiment, includes a notification distribution module 206 that sends a file change notification message from the first local node 104 to the one or more second local nodes 106a-106n in response to receiving identification of the one or more second local nodes 106a-106n flagged to receive file change information for a file path. A second local node 106a-106n, in one embodiment, notifies one or more local client processes flagged to receive file change information in response to receiving a file change notification message from the first local node 104. In one embodiment, the one or more local client processes may be associated with the second local node 106a-106n. In another embodiment, the one or more local client processes associated with the second local node 106a-106n are different than the local client processes associated with the first local node 104. A local client process, in one embodiment, represents a client 112 connected to a second local node 106a-106n and sends a client 112 a file change notification in response to the local client process receiving a file change notification message.

The first local node 104 and the one or more second local nodes 106a-106n, in one embodiment, may store file change notification information. For example, information regarding local client processes flagged to receive file change information, such as a process identifier and/or process attributes, may be stored on a local node 104, 106a-106n. In another embodiment, the global node 108 stores identification information, such as a node name or a node number, associated with the one or more second local nodes 106a-106n flagged to receive file change information.

The notification distribution module 206, in one embodiment, sends a file change notification message from the first local node 104 to one or more second local nodes 106a-106n without sending the file change notification message to the global node 108. The global node 108, in a further embodiment, stores identification information regarding the one or more second local nodes 106a-106n flagged to receive file change information without storing file change notification information and/or local client process information associated with the file change notification information.

In one embodiment, the notification distribution module 206 sends a file change notification message to one or more second local nodes 106a-106n having one or more local client processes flagged to receive file change information for every parent directory in the file path. For example, if the notification creation module 202 creates a file change notification message for the file path "/usr/documents," the notification distribution module 206 will send a file change notification message to one or more second local nodes 106a-106n having local client processes flagged to receive file change information for the "/usr" directory in response to receiving identification of the one or more second local nodes 106a-106n. In one embodiment, a file change notification message may be recursively propagated through directories that are a part of the file path where the file change occurred.

The apparatus 200 is typically advantageous over conventional file change notification systems in a scale-out network-attached storage environment because the apparatus 200 may store information regarding file change notifications and/or local client process data on the local nodes 104, 106a-106n instead of on the global node 108. This may alleviate scaling and performance issues caused by local nodes 104, 106a-106n competing to frequently access and/or update the global node 108 because most update actions occur in the local nodes 104, 106a-106n. It may be rarely necessary to perform update actions on the global node 108. Further, the apparatus 200 may reduce the amount of data stored on the global node 108, moving the file change notification and local client process information to the local nodes 104, 106a-106n. Other file notification systems that use a single global node 108 to store data may suffer from efficiency and speed concerns due to the frequent updates to the global node 108, especially as the global node 108 accumulates large amounts of data and the number of clients 112 increases.

Figure 3:
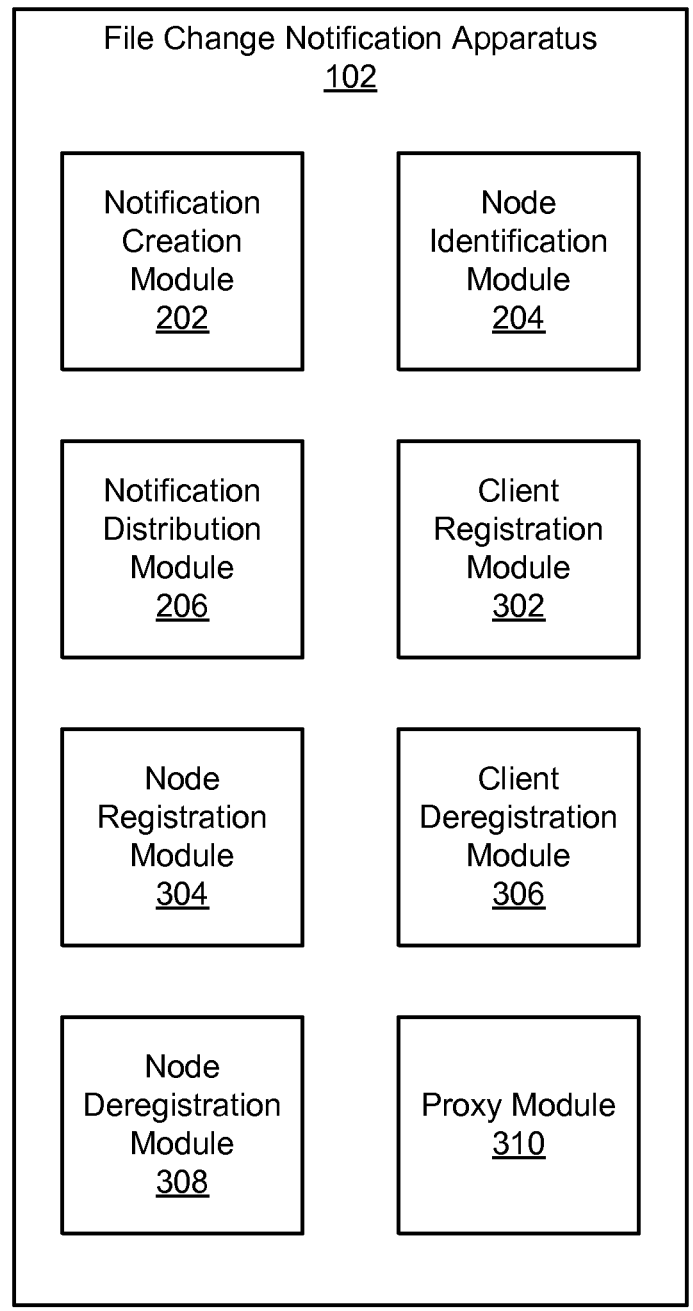
FIG. 3 is a schematic block diagram illustrating another embodiment of an apparatus for file change notifications.

FIG. 3 is a schematic block diagram illustrating another embodiment of an apparatus 300 with another embodiment of a file change notification apparatus 102. The file change notification apparatus 102 may include a notification creation module 202, a node identification module 204, and a notification distribution module 206, which are substantially similar to those described in relation to the apparatus 200 of FIG. 2. In various embodiments, the apparatus 300 may include a client registration module 302, a node registration module 304, a client deregistration module 306, a node deregistration module, 308, and/or a proxy module 310, which are described below.

In one embodiment, the apparatus 300 includes a client registration module 302 that flags a local client process to receive file change information for a file path. A local client process, in one embodiment, sends a file change notification request to an associated local node, either a first local node 104 or a second local node 106a-106n. For example, a local client process interested in receiving file change information for the "/usr/documents" file path may send a file change notification request to the first local node 104. The client registration module 302, in response to receiving the file change notification request, flags the local client process to receive file change information for the "/usr/documents" file path.

The client registration module 302, in one embodiment, stores notification information regarding local client processes flagged to receive file change information on a data store of a local node 104, 106a-106n. In another embodiment, the client registration module 302 stores notification information on a data store of a local node 104, 106a-106n without storing notification information on a data store of a global node 108. In one embodiment, the local data store is located on the local node 104, 106a-106n. In another embodiment, the local data store is located on an external device connected to the local node 104, 106a-106n directly or through the network 110. The notification information, in one embodiment, includes a file path, such as "/usr/documents," a local client process identifier, attributes associated with the local client process, and/or the like.

In a further embodiment, the client registration module 302 stores notification information in a database, such as a relational database, located on a local node 104, 106a-106n. The client registration module 302, in one embodiment, stores the notification information in the database as key-value pairs, where the key is the file path and the value is a local client process identifier and/or one or more process attributes. For example, a key may be the file path "/usr/documents" and the value may be "PID 11: attribute 1" to represent the process identifier and one or more attributes associated with the process flagged to receive file change information for the "/usr/documents" file path. The table below illustrates an example layout for the database:

| Key | Value |
|---|---|
| /usr/documents | PID 11: attribute1 |
| /usr/pictures | PID 21: attribute2, PID 31: attribute3 |

In one embodiment, the apparatus 300 includes a node registration module 304 that flags a local node 104, 106a-106n to receive file change information for a file path. A local node 104, 106a-106n, in one embodiment, may be flagged to receive file change information when a local client process associated with the local node 104, 106a-106n registers to receive file change information for the file path. In another embodiment, the node registration module 304 only flags a local node 104, 106a-106n to receive file change information for a file path when the client registration module 302 flags the first local client process associated with the local node 104, 106a-106n to receive file change information for the file path. For example, when the client registration module 302 flags a local client process to receive file change information for a file path, if it is the first local client process flagged to receive file change information for the local node 104, 106a-106n, the node registration module 304 will flag the node to receive file change information for the file path. Any subsequent registration requests by local client processes for the file path will not require the node registration module 304 to flag the local node 104, 106a-106n again.

The node registration module 304, in one embodiment, stores notification information regarding local nodes 104, 106a-106n flagged to receive file change information on a data store of a global node 108. In one embodiment, the global data store is located on the global node 108. In another embodiment, the global data store is located on an external device connected to the global node 108 directly or through the network 110. The notification information, in one embodiment, includes a file path, such as "/usr/documents," a node name, and/or a node number. In a further embodiment, the node registration module 304 stores notification information in a database, such as a relational database, located on a global node 108. The node registration module 304, in one embodiment, stores the notification information in the database as key-value pairs, where the key is the file path and the value is a node name and/or a node number. For example, a key may be the file path "/usr/documents" and the value may be "NodeX" to represent the node name associate with the local node 104, 106a-106n flagged to receive file change information for the "/usr/documents" file path. The table below illustrates an example layout for the database:

| Key | Value |
|---|---|
| /usr/documents | NodeX |
| /usr/pictures | NodeY, NodeZ |

In one embodiment, the apparatus 300 includes a client deregistration module 306 that unflags a local client process from receiving file change information for a file path in response to the local client process sending an unflag request to an associated local node 104, 106a-106n without sending an unflag request to the global node 108. In one embodiment, it is not necessary to send an unflag request to the global node 108 because the local nodes 104, 106a-106n, and not the global node 108, store notification information for local client processes flagged to receive file change information.

In a further embodiment, the client deregistration module 306 unflags a local client process by deleting notification information regarding the local client process from the local data store of a local node 104, 106a-106n. In another embodiment, the client deregistration module 306 inserts a deletion marker in the local data store in response to unflagging the last client process flagged to receive file change information for a file path. In one embodiment, the deletion marker may include a timestamp reflecting when the client deregistration module 306 deleted the last client process from the local data store. For example, in response to the client deregistration module 306 unflagging the last client process flagged to receive file change information for "/usr/documents," the client deregistration module 306 may insert a timestamp such as "Deleted: 2011-08-10 05:04:01" as the value for the key-value pair keyed by the file path. The table below illustrates an example layout for the local data store after the client deregistration module 306 unflags the last local client process:

| Key | Value |
|---|---|
| /usr/documents | Deleted: 2011-08-10 05:04:01 |
| /usr/pictures | PID 21: attribute2, PID 31: attribute3 |

In one embodiment, the client deregistration module 306 scans the local data store and completely removes key-value pairs marked for deletion from the data store. In another embodiment, the client deregistration module 306 removes key-value pairs marked for deletion in response to the expiration of a predefined grace period.

In one embodiment, the apparatus 300 includes a node deregistration module 308 that unflags a local node 104, 106a-106n from receiving file change information for a file path in response to a local client process associated with the local node 104, 106a-106n unflagging from receiving file change information. In one embodiment, the unflagged local client process is the last local client process flagged to receive file change information for the file path.

In a further embodiment, the node deregistration module 308 unflags a local node 104, 106a-106n by deleting identification information regarding the local node 104, 106a-106n from the global data store of a global node 108. In another embodiment, the node deregistration module 308 inserts a deletion marker in the global data store in response to unflagging the last local node 104, 106a-106n flagged to receive file change information for a file path. In one embodiment, the deletion marker may be a timestamp reflecting when the node deregistration module 308 deleted the last local node 104, 106a-106n from the global data store. For example, in response to the node deregistration module 308 unflagging the last local node 104, 106a-106n flagged to receive file change information for "/usr/documents," the node deregistration module 308 may insert a timestamp such as "Deleted: 2011-08-10 05:04:01" as the value for the key-value pair keyed by the file path. The table below illustrates an example layout for the global data store after the node deregistration module 308 deletes the last local node 104, 106a-106n associated with "/usr/documents":

| Key | Value |
|---|---|
| /usr/documents | Deleted: 2011-08-10 05:04:01 |
| /usr/pictures | Node Y, Node Z |

In one embodiment, the node deregistration module 308 scans the global data store and completely removes key-value pairs marked for deletion from the data store. In another embodiment, the node deregistration module 308 removes key-value pairs marked for deletion in response to the expiration of a predefined grace period.

In one embodiment, the apparatus 300 includes a proxy module 310 that receives a file change notification message from a first local node 104 and sends the file change notification message to one or more local client processes flagged to receive file change information in response to receiving identification of one or more local client processes flagged to receive file change information. In one embodiment, the proxy module 310 is located on a local node 104, 106a-106n and scans a local data store of the local node 104, 106a-106n to identify the one or more local client processes flagged to receive file change information for a file path. In another embodiment, the proxy module 310 creates a file change notification message for each local client process flagged to receive file change information for a file path and sends a file change notification message to each local client process.

Figure 4:
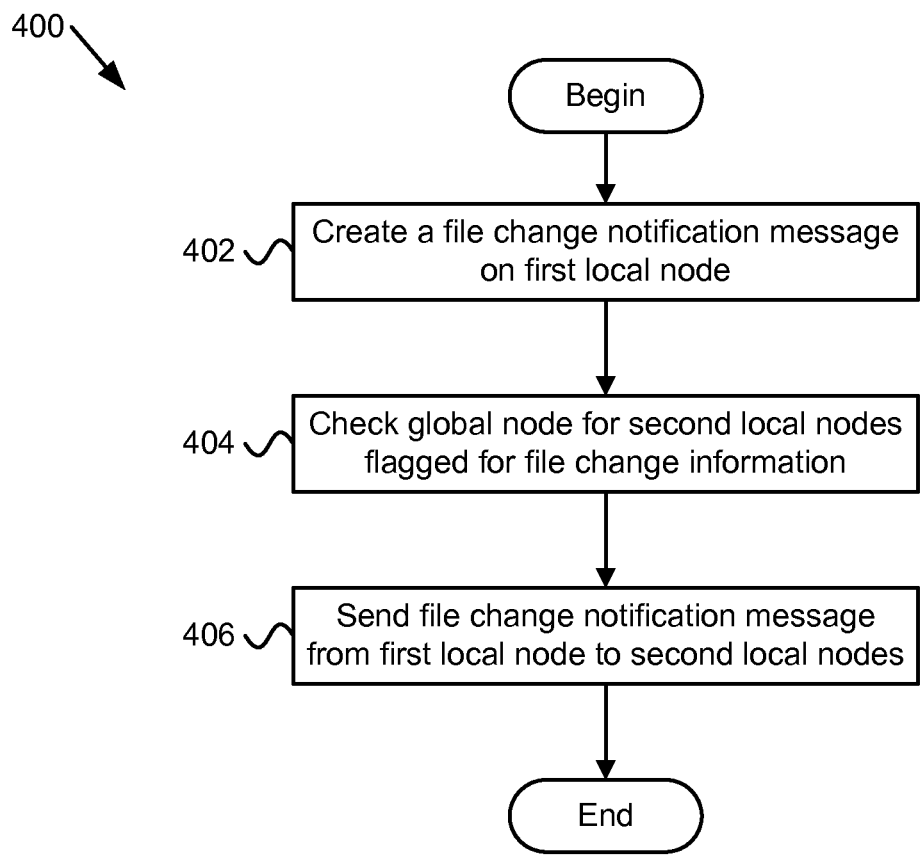
FIG. 4 is a schematic flow chart diagram illustrating one embodiment of a method for file change notifications.

FIG. 4 is a schematic flow chart diagram illustrating one embodiment of a method 400 for file notifications. The method 400 begins and creates 402 a file change notification message on a first local node 104 in response to a client 112 creating, deleting, and/or modifying a file system item addressed though a file path. In one embodiment, the first local node 104 sends a file change notification message to one or more local client processes flagged to receive file change information for the file path. In another embodiment, the one or more local client processes may be associated with the first local node 104 and may represent a client 112 connected to the first local node 104. In one embodiment, the notification message sent from the first local node 104 may include information regarding a file change for the file path. In a further embodiment, the notification creation module 202 creates the file change notification message.

The method 400 checks 404 a global node 108 for one or more second local nodes 106a-106n flagged to receive file change information for a file path. In one embodiment, the one or more second local nodes 106a-106n are different than the first local node 104. In another embodiment, a node identification module 204 checks a global node 108 for one or more second local nodes 106a-106n flagged to receive file change information.

The method 400 sends 406 a file change notification message from the first local node 104 to the one or more second local nodes 106a-106n in response to receiving identification of the one or more second local nodes 106a-106n flagged to receive file change information for the file path. In one embodiment, a second local node 106a-106n notifies one or more local client processes flagged to receive file change information for the file path. The one or more local processes, in one embodiment, may be associated with the second local node 106a-106n and may be different than the one or more local processes associated with the first local node 104. A local process, in another embodiment, represents a client connected to a second local node 106a-106n. In one embodiment a notification distribution module 206 sends a file change notification message from the first local node 104 to the one or more second local nodes 106a-106n.

Figure 5:
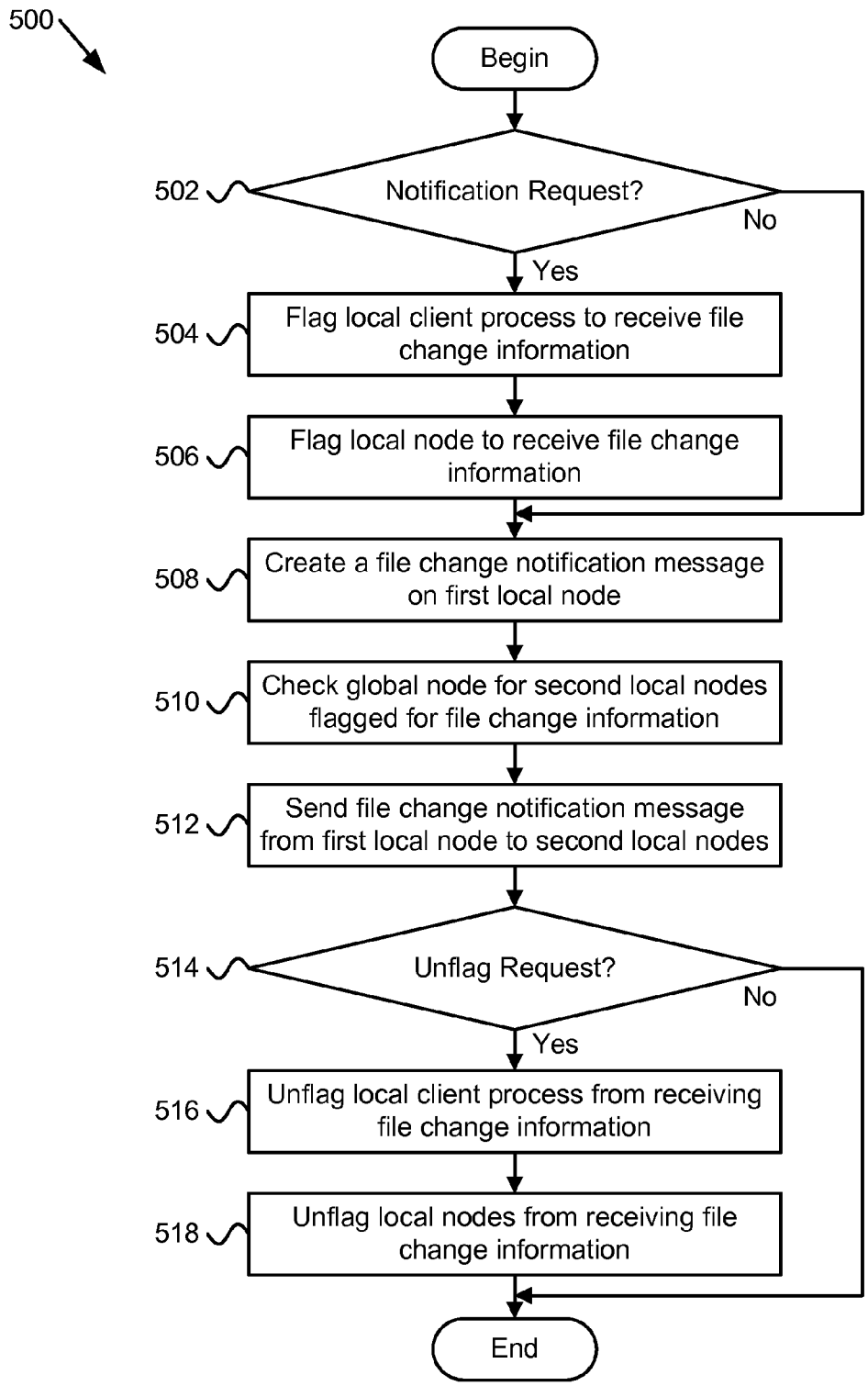
FIG. 5 is a schematic flow chart diagram illustrating another embodiment of a method for file change notifications.

FIG. 5 is a schematic flow chart diagram illustrating another embodiment of a method 500 for file notifications. The method 500 begins and determines 502 if a local client process sent a file change notification request for a file path. If the method 500 determines that a local client process sent a file change notification request, the method 500 flags 504 the local client process to receive file change information for the file path. In one embodiment, a client registration module 302 flags a local client process to receive file change information by storing notification information associated with the local client process in a local data store. The method 500 flags a local node 104, 106a-106n to receive file change information for a file path in response to a local client process being flagged to receive file change information for the file path. In one embodiment, a node registration module 304 flags a local node 104, 106a-106n to receive file change information for a file path by storing identification information in a global data store. In another embodiment, the node registration module 306 flags a local node 104, 106a-106n to receive file change information for a file path only when the first local client process associated with the local node 104, 106a-106n is flagged to receive file change information for a file path.

The method 500 creates 508 a file change notification message on a first local node 104, checks 510 a global node 108 for one or more second local nodes 106a-106n flagged to receive file change information, and sends 512 a file change notification message from the first local node 104 to the one or more second local nodes 106a-106n flagged to receive file change information for the file path.

The method 500 determines 514 if a local client process flagged to receive file change information for a file path sent an unflag request. If the method 500 determines that a local client process sent an unflag request, the method 500 unflags 516 the local client process from receiving file change information. In one embodiment, a client deregistration module 306 unflags a local client process from receiving file change information by deleting notification information associated with the local client process from the local data store. The method 500 unflags 518 a local node 104, 106a-106n from receiving file change information for a file path in response to a local client process associated with the local node 104, 106a-106n being unflagged from receiving file change information. In one embodiment, a node deregistration module 308 unflags a local node from receiving file change information for a file path by deleting identification information associated with the local node 104, 106a-106n from the global data store. In another embodiment, the node deregistration module 308 unflags a local node 104, 106a-106n from receiving file change information for a file path only when the last local client process associated with the local node 104, 106a-106n is unflagged from receiving file change information for the file path. If the method 500 determines that an unflag request was not sent, the method 500 ends.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

receiving a client file change notification request from a local client process at a local node, the client file change notification request specifying a file path and an identifier for the local client process such that a file change notification message is sent to the local client process in response to detecting a change in a directory specified by the file path;

performing a first flagging of a local client process at one or more of a first local node and one or more second local nodes to receive file change information in response to receiving the client file change notification request from a local client process at a local node without sending the file change notification request to a global node to reduce communications with the global node;

creating an entry for the local client process in a local database of the first local node based on the client file change notification request, the local database comprising entries corresponding to the first flagging of the local client processes, the local database entry comprising the local client process identifier and the file path;

performing a second flagging of the first local node to receive file change information for a file path in response to the first flagging, the local client process being the first local client process of a plurality of local client processes associated with the local node flagged to receive file change information for the file path;

creating an entry for the first local node in a global database of a global node in response to the second flagging, the global database comprising entries corresponding to the second flagging of the first local node, the global database entry comprising the local node identifier and the file path;

detecting by the first local node a file change that comprises a client one or more of creating, deleting, or modifying a file system item addressed through a file path;

creating, on the first local node, a file change notification message in response to detecting the file change, the first local node sending the file change notification message to one or more local client processes flagged to receive file change information for the file path based on entries in the local database, wherein a local client process is associated with the first local node and represents a client connected to the first local node and wherein the file change notification message comprises information regarding a file change for the file path;

checking the global database of the global node to determine one or more second local nodes flagged to receive file change information for the file path, the one or more second local nodes different than the first local node;

sending a file change notification message from the first local node to the determined one or more second local nodes in response to receiving identification of the one or more second local nodes flagged to receive file change information for the file path, a second local node sending a file change notification message to one or more second local client processes flagged to receive file change information for the file path, the one or more second local client processes associated with the second local node and being different than the one or more local client processes associated with the first local node wherein a second local client process represents a client connected to a second local node;

receiving, by the first local node, a client unflaq request, the client unflag request specifying the file path and the identifier for the local client process such that delivery of the file change notification messages to the local client process in response to detecting a change in a directory specified by the file path ceases;

performing a first unflagging of a local client process at the first local node from receiving file change information for the file path in response to the client unflag request without sending the client unflag request to the global node;

updating an entry for the local client process in the local database with a deletion marker and a first timestamp based on a determination that the local client process is the last local client process unflagged to receive file change notifications for the file path, the first timestamp indicating a time when the last local client process was unflagged to receive file change notifications for the file path, the entry being removed from the local database in response to expiration of a predetermined period of time after the time indicated by the first timestamp;

performing a second unflagging of a local node from receiving file change information for a file path in response to the first unflagging, the local client process being the last local client process of a plurality of local client processes associated with the furst local node unflagged to receive file change information for the file path; and updating an entry for the first local node in the global database with a deletion marker and a second timestamp in response to the second unflagging, the second timestamp indicating a time when the last local node was unflagged to receive file change notifications for the file path, the entry being removed from the global database based on expiration of a predetermined period of time after the time indicated by the second timestamp.

2. The method of claim 1, wherein one or more local nodes store file change notification information and the global node stores identification of the one or more second local nodes flagged to receive file change information, wherein the first local node sends the file change notification message to the one or more second local nodes without sending the file change notification message to the global node.

3. The method of claim 1, wherein the global node stores identification of the one or more second local nodes flagged to receive file change information without storing one or more of file change notification information and local client process information associated with the file change notification information.

4. The method of claim 1, wherein a second local node comprises a local proxy process, wherein the local proxy process receives a file change notification message from a first local node and sends the file change notification message to one or more local client processes flagged to receive file change information in response to receiving identification of one or more local client processes flagged to receive file change information.

5. The method of claim 1, further comprising sending a file change notification message to one or more second local nodes having one or more local client processes flagged to receive file change information for every parent directory in the file path.

6. The method of claim 1, wherein the first local node, the global node, and the one or more second local nodes communicate over a network protocol, the network protocol comprising a server message block protocol.

7. A computer program product for file notifications in a scale-out network-attached storage system, the computer program product comprising a non-transitory computer readable storage medium having program code embodied therein, the program code readable/executable by a processor to:

receive a client file change notification request from a local client process at a local node, the client file change notification request specifying a file path and an identifier for the local client process such that a file change notification message is sent to the local client process in response to detecting a change in a directory specified by the file path;

perform a first flagging of a local client process at one or more of a first local node and one or more second local nodes to receive file change information in response to receiving the client file change notification request from a local client process at a local node without sending the file change notification request to a global node to reduce communications with the global node;

create an entry for the local client process in a local database of the first local node based on the client file change notification request, the local database comprising entries corresponding to the first flagging of the local client processes, the local database entry comprising the local client process identifier and the file path;

perform a second flagging of the first local node to receive file change information for a file path in response to the first flagging, the local client process being the first local client process of a plurality of local client processes associated with the local node flagged to receive file change information for the file path;

create an entry for first local node in a global database of a global node in response to the second flagging, the global database comprising entries corresponding to the second flagging of the first local node, the global database entry comprising the local node identifier and the file path;

detect by the first local node a file change that comprises a client one or more of creating, deleting, or modifying a file system item addressed through a file path;

create, on the first local node, a file change notification message in response to detecting the file change, the first local node sending the file change notification message to one or more local client processes flagged to receive file change information for the file path based on entries in the local database, wherein a local client process is associated with the first local node and represents a client connected to the first local node and wherein the file change notification message comprises information regarding a file change for the file path;

check the global database of the global node to determine one or more second local nodes flagged to receive file change information for the file path, the one or more second local nodes different than the first local node;

send a file change notification message from the first local node to the determined one or more second local nodes in response to receiving identification of the one or more second local nodes flagged to receive file change information for the file path, a second local node sending a file change notification message to one or more second local client processes flagged to receive file change information for the file path, the one or more second local client processes associated with the second local node and being different than the one or more local client processes associated with the first local node wherein a second local client process represents a client connected to a second local node;

receive, by the first local node, a client unflaq request, the client unflaq request specifying the file path and the identifier for the local client process such that delivery of the file change notification messages to the local client process in response to detecting a change in a directory specified by the file path ceases;

perform a first unflagging of a local client process at the first local node from receiving file change information for the file path in response to the client unflag request without sending the client unflag request to the global node;

update an entry for the local client process in the local database with a deletion marker and a first timestamp based on a determination that the local client process is the last local client process unflagged to receive file change notifications for the file path, the first timestamp indicating a time when the last local client process was unflagged to receive file change notifications for the file path, the entry being removed from the local database in response to expiration of a predetermined period of time after the time indicated by the first timestamp;

performing a second unflagging of a local node from receiving file change information for a file path in response to the first unflagging, the local client process being the last local client process of a plurality of local client processes associated with the furst local node unflagged to receive file change information for the file path; and update an entry for the first local node in the global database with a deletion marker and a second timestamp in response to the second unflagging, the second timestamp indicating a time when the last local node was unflagged to receive file change notifications for the file path, the entry being removed from the global database based on expiration of a predetermined period of time after the time indicated by the second timestamp.

8. The computer program product of claim 7, wherein one or more local nodes store file change notification information and the global node stores identification of the one or more second local nodes flagged to receive file change information, wherein the first local node sends the file change notification message to the one or more second local nodes without sending the file change notification message to the global node.

9. The computer program product of claim 7, wherein the global node stores identification of the one or more second local nodes flagged to receive file change information without storing one or more of file change notification information and local client process information associated with the file change notification information.

* * * * *